US008156228B1

(12) United States Patent
Hernacki et al.

(10) Patent No.: US 8,156,228 B1
(45) Date of Patent: Apr. 10, 2012

(54) METHOD AND APPARATUS TO ENABLE CONFIDENTIAL BROWSER REFERRALS

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 298 days.

(21) Appl. No.: 11/864,348

(22) Filed: Sep. 28, 2007

(51) Int. Cl.
*G06F 15/16* (2006.01)
(52) U.S. Cl. ......... 709/227; 709/229; 709/217; 709/219
(58) Field of Classification Search .................... 709/229
See application file for complete search history.

(56) References Cited

U.S. PATENT DOCUMENTS

| | | | | |
|---|---|---|---|---|
| 6,092,196 A | * | 7/2000 | Reiche | 726/6 |
| 6,760,758 B1 | * | 7/2004 | Lund et al. | 709/217 |
| 2002/0133613 A1 | * | 9/2002 | Teng et al. | 709/235 |
| 2003/0051054 A1 | * | 3/2003 | Redlich et al. | 709/246 |
| 2003/0080997 A1 | * | 5/2003 | Fuehren et al. | 345/744 |
| 2004/0054898 A1 | * | 3/2004 | Chao et al. | 713/168 |
| 2004/0205198 A1 | * | 10/2004 | Zellner et al. | 709/228 |
| 2005/0074126 A1 | * | 4/2005 | Stanko | 380/279 |
| 2006/0200503 A1 | * | 9/2006 | Dosa et al. | 707/203 |
| 2008/0016151 A1 | * | 1/2008 | Howard et al. | 709/203 |
| 2010/0100724 A1 | * | 4/2010 | Kaliski, Jr. | 713/155 |

* cited by examiner

*Primary Examiner* — Kevin Bates
*Assistant Examiner* — Mohammed Ahmed
(74) *Attorney, Agent, or Firm* — Wilmer Cutler Pickering Hale and Dorr LLP

(57) ABSTRACT

A method of facilitating a blind referral comprising producing a referral communication for referring a client computer from a connection with a first server to a second server, wherein the referral communication comprises first server information defining a location of the first server, generating a placeholder for the first server information in the referral communication, and replacing the first server information with the placeholder in communications with the second server during the referral communication.

10 Claims, 3 Drawing Sheets

SYSTEM 100

METHOD 200

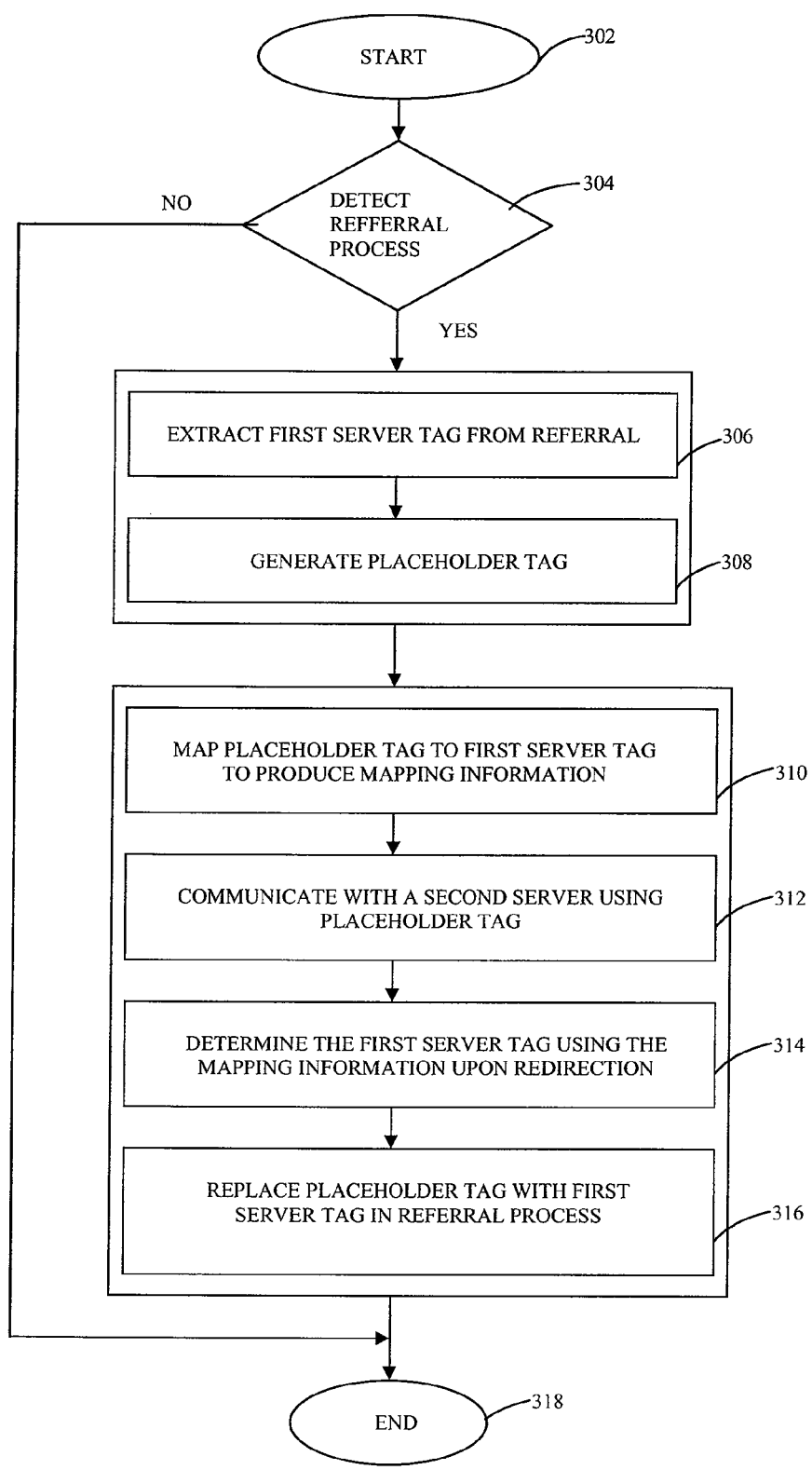
FIG. 3   METHOD 300

METHOD AND APPARATUS TO ENABLE CONFIDENTIAL BROWSER REFERRALS

BACKGROUND OF THE INVENTION

1. Field of the Invention

Embodiments of the present invention generally relate to network computing and, more particularly, to a method and apparatus for facilitating a blind referral within a network environment wherein browsers are used.

2. Description of the Related Art

When using a browser, one server may refer a browser to another server to either receive certain information or to authorize a user for specific access. For example, upon selecting a specific link in a first server, the browser is referred to a second server for user identity verification. The second server confirms the identity of the user and refers the browser back to the first server with information that enables the user to access the information at the link.

During conventional referrals, a client computer is required to disclose information about the first server to the second server. In most cases, the second server needs the first server information in order to refer back to the first server upon redirection, i.e., after user identity confirmation. This creates privacy and security issues for the user of the client computer, i.e., the HTTP information is tagged with every website the browser has recently visited. As such, intercepting this list enables someone to know a user's history. Such information may provide a list of secure sites used by the user or may merely disclose types of sites the user enjoys visiting. In either case, this information is private information. No solution exists that prevents the second server (or any interceptor) from finding out about the client's use of the first server, and any other servers that are in the referral chain.

Accordingly, there exists a need for a method and apparatus that facilitates blind referrals within a network computing environment wherein browsers are used.

SUMMARY OF THE INVENTION

Embodiments of the present invention comprise a method and apparatus for facilitating a blind referral. One embodiment of the invention is a method of facilitating a blind referral comprising producing a referral communication for referring a client computer from a connection with a first server to a second server, wherein the referral communication comprises first server information defining a location of the first server, generating a placeholder for the first server information in the referral communication, and replacing the first server information with the placeholder in communications with the second server during the referral communication.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is another flow chart of a method for facilitating a blind referral according to various embodiments of the present invention.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means at least one.

DETAILED DESCRIPTION

Figure 1:
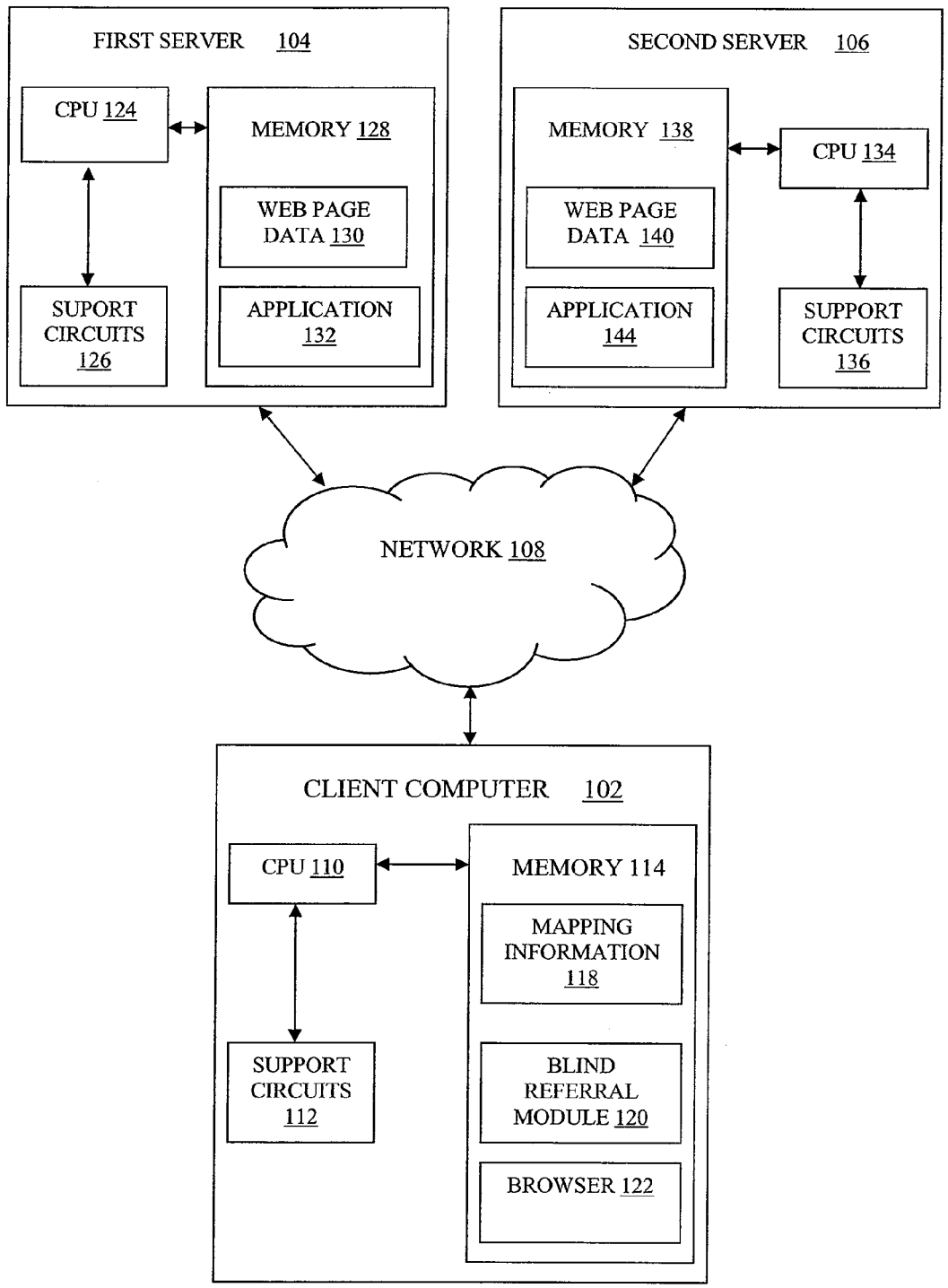
FIG. 1 is a block diagram of a computer system according to various embodiments of the present invention.

FIG. 1 is a block diagram of a computer system 100 according to various embodiments of the present invention. The computer system 100 comprises a client computer 102, a first server 104, and a second server 106 running several applications and connected to a network 108 that generally forms a portion of the Internet which may comprise various sub-networks such as Ethernet networks, local area networks, wide area networks, wireless networks, and the like. Those skilled in the art will appreciate that the hardware depicted in the FIG. 1 may vary from one computer system to another. For example, other peripheral devices, such as optical disk drives, graphics card, data storage devices, various other input devices, peripherals and the like, may also be used in addition to or in place of the hardware depicted. The network 108 provides access to the client computer 102 for various applications located on the first server 104 and the second server 106.

The first server 104 comprises, without limitation, a CPU 124, support circuits 126, and a memory 128. The CPU 124 may be one or more of any commercially available microprocessors or microcontrollers. The support circuits 126 comprise circuits and devices that are used in support of the operation of the CPU 124. Such support circuits include, for example, one or more of cache, input/output circuits, system bus, PCI bus, clock circuits, power supplies or the like. The memory 128 may comprise random access memory, read only memory, optical memory, disk drives, removable memory, and the like. Various types of software processes or modules and information are resident within the memory 128. For example, various processes such as an Operating System (OS) kernel (not shown), a software library (not shown), and software modules, for example, Web Page Data modules 130, and Application module 132 are illustrated as being resident in the memory 128. The Web Page Data module 130 may store the first server information that is used in a referral communication (e.g., a data segment in HTTP protocol). Application module 132 may be any application of interest to the user of client computer 104 e.g., a browser.

The second server 106 comprises, without limitation, a CPU 134, support circuits 136, and a memory 138. The CPU 134 may be one or more of any commercially available microprocessors or microcontrollers. The support circuits 136 comprise circuits and devices that are used in support of the operation of the CPU 134. Such support circuits include, for example, one or more of cache, input/output circuits, system bus, PCI bus, clock circuits, power supplies or the like. The memory 138 may comprise random access memory, read only memory, optical memory, disk drives, removable memory, and the like. Various types of software processes or modules and information are resident within the memory 138. For example, various processes such as an Operating System (OS) kernel (not shown), a software library (not shown), and software modules, for example, web page data module 140, and application module 144 are illustrated as being resident in the memory 138. The web page data module 140 may store website information about a user of client computer 102, e.g., data segments in HTTP protocol for every website recently visited by the user of client computer 102. Application 144 may comprise software enables communications with the client computer 102 (e.g., completion of an age or identity verification) and then redirect the client computer to the first server 104.

The client computer 102 comprises, also without limitation, a CPU 110, support circuits 112, and a memory 114. The CPU 110 may be one or more of any commercially available microprocessors or microcontrollers. The support circuits 112 comprise circuits and devices that are used in support of the operation of the CPU 110 Such support circuits include, for example, one or more of cache, input/output circuits, system bus, PCI bus, clock circuits, power supplies or the like. The memory 114 may comprise random access memory, read only memory, optical memory, disk drives, removable memory, and the like. Various types of software processes or modules and information are resident within the memory 114. For example, various processes such as an Operating System (OS) kernel (not shown), a software library (not shown), and software modules, for example, modules 118, 120, 122, are illustrated as being resident in the memory 114. The module 118 comprises mapping information in accordance with certain aspects of the present invention. The mapping information contains data that matches a placeholder generated by blind referral module 120 to the first server 104 address information. Generally, the placeholder is a set of dummy characters or may be a dummy address. The mapping information 118 and blind referral module 120 may form a portion of or may be coupled to a browser 122.

Figure 2:
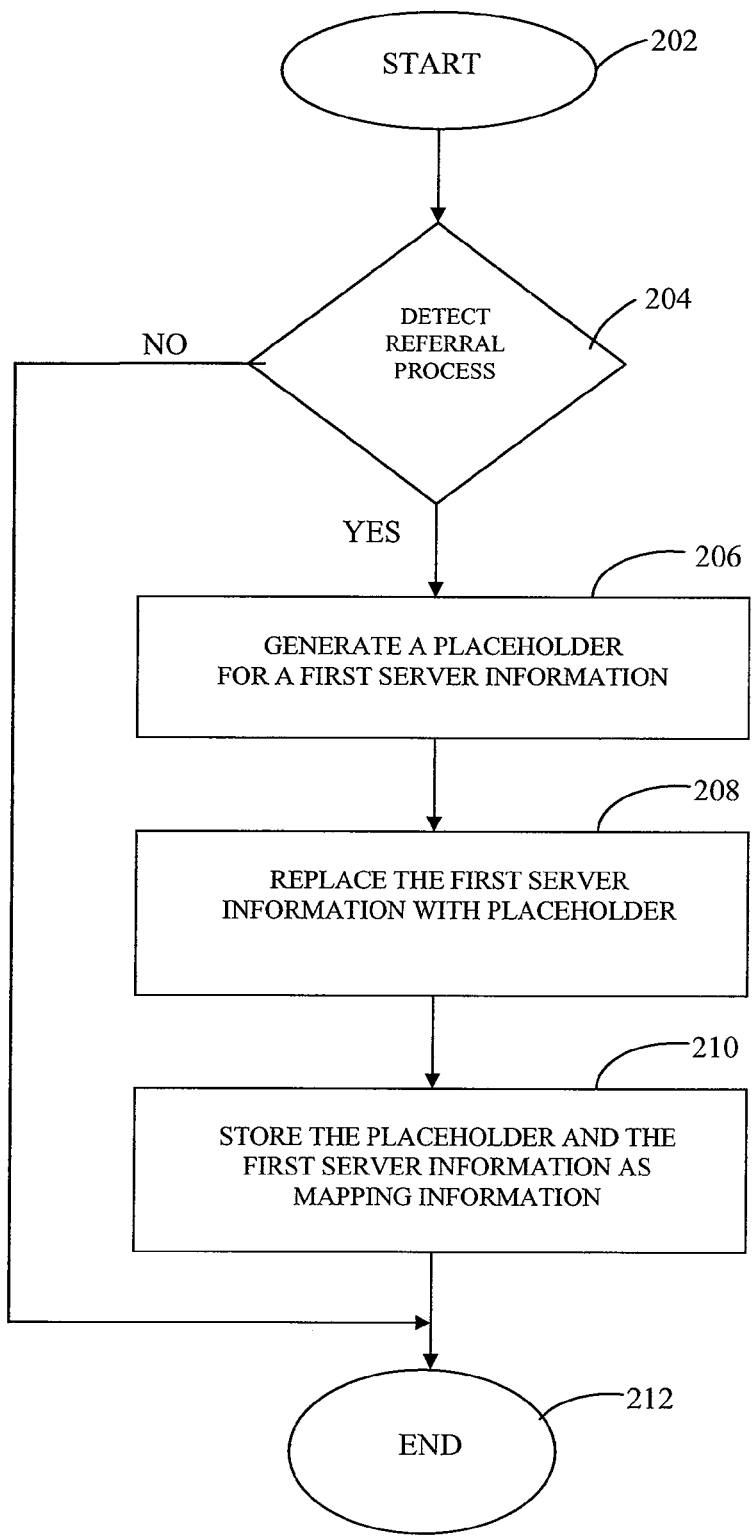
FIG. 2 is a flow chart of a method for facilitating a blind referral according to an embodiment of the present invention.

One embodiment of the present invention is a method that is performed by the browser 122 of FIG. 1 for facilitating a blind referral. For example, FIG. 2 depicts a flow diagram of method 200 for facilitating a blind referral. The method 200 begins at step 202 and proceeds to step 204, wherein the method 200 ascertains if a referral communication has been initiated. If no referral communication is detected (option "No"), the method ends at step 212. The referral communication is detected when the browser 122 is informed that the first server 104 is redirecting the browser 122 to the second server 106.

If the referral communication is detected (option "Yes"), then at step 206, a placeholder for a first server information is generated (e.g., a set of dummy characters or a dummy address). The placeholder may also comprise at least one of a hash value, a client identification, a service identification, a proxy server, or a random alphanumeric string of characters. At step 208, the first server information (e.g., a data segment in HTTP protocol for every website recently visited by the user of client computer 102) is replaced with the placeholder. As such, the HTTP protocol cannot be analyzed to determine that the first server was visited by the user. To facilitate redirection back to the first server, the method 200 stores the first server information and the placeholder as mapping information. When redirection is needed, the browser uses the mapping information to identify the first server and redirect the connection to that server as described below. The method, again, ends at step 212.

FIG. 3 depicts a flow diagram of a method 300 for performing a referral communication in accordance with an alternative embodiment of the invention wherein the second server redirects the browser back to the first server. The method begins at step 302 and proceeds to step 304, wherein the method 300 ascertains if a referral communication has been initiated, e.g., has the browser detected a redirection. If a referral communication is not detected at step 304 (option "No"), the method ends at step 318.

If it is ascertained that a referral communication has been initiated (option "Yes"), then, at step 306, a first server tag (e.g., a data segment in HTTP protocol) is extracted from the referral communication. Next, at step 308, the blind referral module such as the blind referral module 120 that is resident in the client computer 102, generates a placeholder tag (e.g., an HTTP tag for HTTP headers). In step 310, the placeholder tag is mapped to the first server tag. That is, for example, blind referral module 120 may relate the first server tag to the placeholder tag in a look-up table stored in the memory 114 as mapping information 118. At step 312, after the placeholder is mapped, the client computer 102 may communicate with the second server 106 using the placeholder tag which, for example, has been placed in the first server HTTP header. Now, the second server 106 does not have any information regarding the identity of the first server 104.

Once the second server 106 has finished communicating with the client computer 102 (e.g., completion of an age or identity verification), the client computer 102 is redirected by the blind referral module 120 to the placeholder address, at step 314. At step 316, the blind referral module 120 extracts the placeholder tag and replaces it with the first server tag using the mapped information. Accordingly, the second server 106 blindly refers the client computer 102 to the first server 104. In this manner a client computer always maintains control of the referral information. Method 300 ends at step 318.

In yet another embodiment of the present invention, the placeholder generated for the second server is verified using a security service coupled to the second server.

While the foregoing is directed to embodiments of the present invention, other and further embodiments of the invention may be devised without departing from the basic scope thereof, and the scope thereof is determined by the claims that follow.

What is claimed is:

1. A method of facilitating a blind referral, comprising:
producing a referral communication for referring a client computer from a connection with a first server to a second server, wherein the referral communication comprises first server information defining a location of the first server, wherein the referral communication refers the client computer to the second server to authenticate at least one of an identity, a source of funds, or an age of a user;
generating a placeholder for the first server information in the referral communication, wherein the placeholder comprises at least one of a hash value, a client computer identification, a service identification, a proxy server, or a random alphanumeric character string, and wherein the random alphanumeric character string comprises a set of dummy characters or a dummy address; and replacing the first server information with the placeholder in communications with the second server during the referral communication to prevent the second server from learning an identity of the first server such that the second server receives the placeholder instead of the first server information.

2. The method of claim 1, wherein the step of replacing further comprises replacing the first server information with the placeholder in the referral communication upon redirection from the first server to the second server.

3. The method of claim 1, further comprising mapping the placeholder to the first server information to produce mapping information.

4. The method of claim 3, further comprising
extracting the placeholder from the referral communication upon redirection of the client computer from the second server to the first server;
determining the first server information mapped to the placeholder using the mapping information; and
replacing the placeholder with the first server information to enable redirection from the second server to the first server.

5. A method of facilitating a blind referral, comprising:
producing an HTTP referral communication for referring a client computer from a first server to a second server, wherein the referral communication comprises a first server tag, wherein the HTTP referral communication enables redirection of the client computer to the second server to perform at least one of authenticating at least one of an identity, a source of funds, or an age of a user;
generating a placeholder tag, wherein the placeholder tag comprises at least one of a hash value, a client name, a security service, a proxy server, or a random alphanumeric, and wherein the random alphanumeric comprises a set of dummy characters or a dummy address;
replacing the first server tag in a header of an HTTP referral communication with the placeholder tag upon redirection of the client computer from the first server to the second server communication to prevent the second server from learning an identity of the first server such that the second server receives the placeholder instead of the first server information;
upon redirection of the client computer from the second server to the first server, mapping the placeholder tag to the first server tag to produce mapping information;
determining the first server tag that maps to the placeholder tag using the mapping information; and
replacing the placeholder tag in the header of the HTTP referral communication with the first server tag upon redirection from the second server to the first server.

6. The method of claim 5, further comprising
extracting the placeholder tag from the HTTP referral communication upon redirection from the second server to the first server.

7. The method of claim 5, further comprising
verifying the placeholder tag for the second server using a security service coupled to the second server.

8. An apparatus for facilitating a blind referral, comprising:
a client computer, configured to be redirected using a referral communication from communicating with a first server to communicating with a second server, wherein the client computer comprises a blind referral module for generating a placeholder for a first server information in the referral communication and replacing the first server information in the referral communication with the placeholder upon redirection from the first server to the second server communication to prevent the second server from learning an identity of the first server such that the second server receives the placeholder instead of the first server information, wherein the placeholder comprises at least one of a hash value, a client computer identification, a service identification, a proxy server, or a random alphanumeric character string, and wherein the random alphanumeric character string comprises a set of dummy characters or a dummy address.

9. The apparatus of claim 8, further comprising
mapping information comprising the placeholder mapped to the first server information.

10. The apparatus of claim 9, wherein the blind referral module determines the first server information mapped to the placeholder using the mapping information and, upon the client computer being redirected from the second server to the first server, substitutes the placeholder in the referral communication with the first server information.

* * * * *